United States Patent
Yamamoto et al.

(10) Patent No.: US 10,773,486 B2
(45) Date of Patent: Sep. 15, 2020

(54) FUNCTIONAL LAYER INCLUDING LAYERED DOUBLE HYDROXIDE, AND COMPOSITE MATERIAL

(71) Applicant: NGK INSULATORS, LTD., Nagoya-Shi (JP)

(72) Inventors: Sho Yamamoto, Nagoya (JP); Shohei Yokoyama, Nagoya (JP)

(73) Assignee: NGK Insulators, Ltd., Nagoya-Shi (JP)

( * ) Notice: Subject to any disclaimer, the term of this patent is extended or adjusted under 35 U.S.C. 154(b) by 82 days.

(21) Appl. No.: 16/227,331

(22) Filed: Dec. 20, 2018

(65) Prior Publication Data
US 2019/0131605 A1 May 2, 2019

Related U.S. Application Data

(63) Continuation of application No. PCT/JP2017/012422, filed on Mar. 27, 2017.

(30) Foreign Application Priority Data

Jun. 24, 2016 (JP) .................................. 2016-125531
Jun. 24, 2016 (JP) .................................. 2016-125554
Jun. 24, 2016 (JP) .................................. 2016-125562
Jan. 31, 2017 (WO) .................. PCT/JP2017/003333

(51) Int. Cl.
*H01M 2/16* (2006.01)
*H01M 2/14* (2006.01)
(Continued)

(52) U.S. Cl.
CPC .................. *B32B 5/18* (2013.01); *B32B 9/00* (2013.01); *B32B 9/005* (2013.01); *C01F 7/00* (2013.01);
(Continued)

(58) Field of Classification Search
CPC ... C04B 41/52; C04B 41/5072; C04B 41/009; C04B 2103/0013; C04B 2103/0019; C04B 2103/0021; C04B 35/48; C04B 38/00; C04B 41/0072; C04B 41/4521; C04B 41/4535; C04B 41/4537; C04B 2111/00853; C04B 2235/3225;
(Continued)

(56) References Cited

U.S. PATENT DOCUMENTS

2009/0142394 A1 6/2009 Okada et al.
2014/0315099 A1 10/2014 Yamada et al.
(Continued)

FOREIGN PATENT DOCUMENTS

JP   2005-089277 A1   4/2005
JP   2013-201056 A1   10/2013
(Continued)

OTHER PUBLICATIONS

Extended European Search Report (Application No. 17814969.6) dated Jan. 22, 2020.
(Continued)

*Primary Examiner* — Carlos Barcena
(74) *Attorney, Agent, or Firm* — Burr & Brown, PLLC (57) ABSTRACT

A battery including, as a separator, a functional layer including a layered double hydroxide that contains Ni, Al, Ti and Zn, and has an atomic ratio Zn/(Ni+Ti+Al+Zn) of 0.04 or more determined by an energy dispersive X-ray analysis (EDS).

13 Claims, 3 Drawing Sheets

(51) Int. Cl.
    *C01G 23/04*     (2006.01)
    *B32B 9/00*     (2006.01)
    *B32B 5/18*     (2006.01)
    *C01F 7/00*     (2006.01)
    *C01G 23/00*     (2006.01)
    *C01G 53/00*     (2006.01)
    *C01F 7/02*     (2006.01)
    *C01G 53/04*     (2006.01)
    *H01M 10/26*     (2006.01)
    *C01G 23/047*     (2006.01)
    *H01M 4/24*     (2006.01)
    *H01M 4/32*     (2006.01)

(52) U.S. Cl.
    CPC ................ *C01F 7/02* (2013.01); *C01G 23/00* (2013.01); *C01G 23/04* (2013.01); *C01G 23/047* (2013.01); *C01G 53/00* (2013.01); *C01G 53/006* (2013.01); *C01G 53/04* (2013.01); *H01M 2/145* (2013.01); *H01M 2/16* (2013.01); *H01M 2/1646* (2013.01); *H01M 2/1686* (2013.01); *H01M 4/244* (2013.01); *H01M 4/32* (2013.01); *H01M 10/26* (2013.01); *B32B 2305/026* (2013.01); *B32B 2457/10* (2013.01); *C01P 2002/22* (2013.01); *C01P 2002/74* (2013.01); *C01P 2004/03* (2013.01); *C01P 2006/16* (2013.01); *C01P 2006/40* (2013.01)

(58) Field of Classification Search
    CPC .... C04B 2235/3246; C04B 2235/6025; C04B 2235/6567; C04B 2237/343; C04B 2237/348; C04B 35/111; C04B 35/486; C04B 35/6342; C04B 35/64; C04B 41/00; C04B 41/89; B32B 2305/026; B32B 2457/10; B32B 5/18; B32B 9/00; B32B 9/005; C01G 23/00; C01G 23/04; C01G 23/047; C01G 53/00; C01G 53/006; C01G 53/04; C01P 2002/22; C01P 2002/74; C01P 2004/03; C01P 2006/16; C01P 2006/40; H01M 10/0562; H01M 10/26; H01M 10/36; H01M 2300/0071; H01M 2/145; H01M 2/16; H01M 2/1646; H01M 2/1686; H01M 4/244; H01M 4/32; C01F 7/00; C01F 7/02

See application file for complete search history.

(56) References Cited

U.S. PATENT DOCUMENTS

| | | |
|---|---|---|
| 2015/0079298 A1 | 3/2015 | Ferreira et al. |
| 2015/0238927 A1 | 8/2015 | O'Hare et al. |
| 2015/0364790 A1 | 12/2015 | Yonehara et al. |
| 2016/0141582 A1 | 5/2016 | Fujisaki et al. |
| 2017/0077476 A1 | 3/2017 | Kitoh et al. |
| 2017/0104241 A1 | 4/2017 | Hayashi et al. |
| 2017/0194614 A1 | 7/2017 | Yokoyama et al. |
| 2017/0260048 A1 | 9/2017 | Yamamoto et al. |

FOREIGN PATENT DOCUMENTS

| | | |
|---|---|---|
| JP | 2014-123431 A1 | 7/2014 |
| JP | 2015-015229 A1 | 1/2015 |
| JP | 2015-520018 A1 | 7/2015 |
| JP | 2015-535797 A1 | 12/2015 |
| JP | 2017-082191 A1 | 5/2017 |
| WO | 2008/075621 A1 | 6/2008 |
| WO | 2013/118561 A1 | 8/2013 |
| WO | 2015/098610 A1 | 7/2015 |
| WO | 2016/006348 A1 | 1/2016 |
| WO | 2016/067885 A1 | 5/2016 |
| WO | 2016/076047 A1 | 5/2016 |
| WO | 2016/098513 A1 | 6/2016 |

OTHER PUBLICATIONS

International Search Report and Written Opinion (Application No. PCT/JP2017/012422) dated Jun. 6, 2017.

International Search Report and Written Opinion (Application No. PCT/JP2017/003333) dated May 16, 2017.

FUNCTIONAL LAYER INCLUDING LAYERED DOUBLE HYDROXIDE, AND COMPOSITE MATERIAL

CROSS-REFERENCE TO RELATED APPLICATIONS

This application is a continuation application of PCT/JP2017/012422 filed Mar. 27, 2017, which claims priority to PCT/JP2017/003333 filed Jan. 31, 2017, Japanese Patent Application No. 2016-125531 filed Jun. 24, 2016, Japanese Patent Application No. 2016-125554 filed Jun. 24, 2016, and Japanese Patent Application No. 2016-125562 filed Jun. 24, 2016, the entire contents all of which are incorporated herein by reference.

BACKGROUND OF THE INVENTION

1. Field of the Invention

The present invention relates to a functional layer including a layered double hydroxide, and a composite material.

2. Description of the Related Art

A layered double hydroxide (hereafter also referred to as LDH) is a material having an exchangeable anions and $H_2O$ as intermediate layers between stacked basic hydroxide layers, and is used as, for example, catalysts, adsorbents and dispersants in polymers for improving heat resistance to take its advantage.

The LDH has also been attractive as a material that conducts hydroxide ions; hence, addition of the LDH to an electrolyte of an alkaline fuel cell and a catalytic layer of a zinc air battery has been studied. In particular, the use of a LDH as a solid electrolyte separator for alkaline secondary batteries such as nickel-zinc secondary batteries and zinc-air secondary batteries has been recently proposed, and composite materials with a LDH containing functional layer suitable for such a separator application are known. For example, Patent Document 1 (WO2015/098610) discloses a composite material comprising a porous substrate and a LDH containing functional layer having no water permeability formed on and/or in the porous substrate. The LDH containing functional layer is represented by the general formula: $M^{2+}_{1-x}M^{3+}_{x}(OH)_2A^{n-}_{x/n} \cdot mH_2O$, wherein $M^{2+}$ is a divalent cation such as $Mg^{2+}$, $M^{3+}$ is a trivalent cation such as $Al^{3+}$, $A^{n-}$ is an n-valent anion such as $OH^-$, $CO_3^{2-}$, n is an integer of 1 or more, x is 0.1 to 0.4, and m is 0 or above 0. The LDH containing functional layer disclosed in Patent Document 1 is densified to such an extent that it has no water permeability. When the LDH is used as a separator, it can prevent deposition of dendritic zinc and penetration of carbon dioxide from an air electrode in zinc air batteries that are obstacles to practical use of alkaline zinc secondary batteries.

Patent Document 2 (WO2016/076047) discloses a separator structure comprising an LDH separator combined with a porous substrate, wherein the LDH separator has high density exhibiting high gas and/or water impermeability. This document also discloses that the LDH separator has high density exhibiting a helium permeability per unit area of 10 cm/min·atm or less.

CITATION LIST

Patent Documents

Patent Document 1: WO2015/098610
Patent Document 2: WO2016/076047

SUMMARY OF THE INVENTION

The present inventors have now found that an ion conductivity is significantly improved by employing a LDH containing Ni, Al, Ti and Zn with an atomic ratio Zn/(Ni+Ti+Al+Zn) of 0.04 or more.

Accordingly, an object of the present invention is to provide a LDH containing functional layer having significantly high ion conductivity, and a composite material provided with the LDH containing functional layer.

One embodiment of the present invention provides a functional layer comprising a layered double hydroxide that contains Ni, Al, Ti and Zn, wherein the atomic ratio Zn/(Ni+Ti+Al+Zn) determined by an energy dispersive X-ray analysis (EDS) is 0.04 or more.

Another embodiment of the present invention provides a composite material that comprises a porous substrate and a functional layer provided on the porous substrate and/or embedded in the porous substrate.

Another embodiment of the present invention provides a battery including the functional layer or the composite material as a separator.

DETAILED DESCRIPTION OF THE INVENTION

LDH Containing Functional Layer and Composite Material

The functional layer of the present invention is a layer containing the layered double hydroxide (LDH). The functional layer (in particular, the LDH contained in the functional layer) can have a hydroxide ion conductivity. The LDH in the functional layer of the present invention contains Ni, Al, Ti and Zn, and an atomic ratio Zn/(Ni+Ti+Al+Zn) is 0.04 or more. Use of an LDH containing Ni, Al, Ti and Zn with an atomic ratio Zn/(Ni+Ti+Al+Zn) of 0.04 or more can provide an LDH containing functional layer having significantly improved ion conductivity. Accordingly, the functional layer of the present invention can exhibit high ion conductivity suitable for a separator for alkaline secondary batteries.

In the LDH contained in the functional layer of the present invention, the ratio of Zn to the total amount of Ni, Ti, Al and Zn, specifically the atomic ratio Zn/(Ni+Ti+Al+Zn), is 0.04 or more, preferably 0.04 to 0.30, more preferably 0.04 to 0.25, further preferably 0.05 to 0.25, particularly preferably 0.05 to 0.20, most preferably 0.06 to 0.15. Within these ranges, the ion conductivity in the LDH containing functional layer can be more effectively improved. The atomic ratio is determined by energy dispersive X-ray analysis (EDS). That is, a compositional analysis may be performed on the surface of the functional layer with an EDS analyzer (for example, X-act, manufactured by Oxford Instruments plc) to calculate the atomic ratio Zn/(Ni+Ti+Al+Zn). This analysis preferably comprises 1) taking an image at an acceleration voltage of 20 kV with 5,000-fold magnification, 2) analysis in a point analytic mode at three points spaced with about 5 μm each other, 3) repetition of Steps 1) and 2) further two times, and 4) calculation of the average value of nine points in total.

The functional layer has preferably an ion conductivity of 2.6 mS/cm and more. Higher ion conductivity is preferred. The upper limit thereof is, for example, 10 mS/cm, which should not be construed as limiting. Such high ion conductivity is particularly suitable for battery application. For example, it is preferred to lower the resistance by thinning in order to put the LDH into practical use, and providing the LDH containing functional layers with desirably low resistance according to the embodiment is particularly advantageous in the application of LDH as a solid electrolyte separator for alkaline secondary batteries such as zinc air batteries or nickel zinc batteries.

As is generally known, the LDH is composed of a plurality of basic hydroxide layers and intermediate layers interposed between these basic hydroxide layers. The basic hydroxide layers are each mainly composed of metallic elements (typically metallic ions) and OH groups. The intermediate layers of the LDH contained in the functional layer are composed of anions and $H_2O$. The anions are monovalent or multivalent anions, preferably monovalent or divalent ions. Preferably, the anions in the LDH include $OH^-$ and/or $CO_3^{2-}$. Meanwhile, high hydroxide ion conductivity is required for electrolytic solutions of alkaline secondary batteries (for example, metal air batteries and nickel zinc batteries) including LDHs, and thus the use of strong alkaline aqueous potassium hydroxide solution at pH of about 14 is desired. For this purpose, it is desirable for LDH to have high alkaline resistance such that it is barely deteriorated even in such a strong alkaline electrolytic solution. Accordingly, it is preferred that the LDH in the present invention do not undergo a change in surface microstructure and crystalline structure during alkaline resistance evaluation described later. In addition, as described above, the LDH has high ion conductivity due to its intrinsic properties and the above composition.

The LDH contained in the functional layer preferably undergoes no changes in the surface microstructure and crystalline structure when immersed in a 6 mol/L aqueous potassium hydroxide solution containing zinc oxide in a concentration of 0.4 mol/L at 70° C. for three weeks or 504 hours because such an LDH has high alkaline resistance. The presence of a change in the surface microstructure can be preferably determined by SEM (Scanning Electron Microscopy), and the presence of a change in the crystalline structure can be preferably determined by crystalline structural analysis (for example, a shift in (003) peak) by XRD (X-ray diffractometry). Potassium hydroxide is a typical strong alkaline substance, and the composition of an aqueous potassium hydroxide solution is equivalent to a typical strong alkaline electrolyte for alkaline secondary batteries. Accordingly, the above evaluation method involving immersion in such a strong alkaline electrolyte for three weeks at a high temperature of 70° C. can be a severe alkaline resistance test. As described above, high alkaline resistance that barely exhibits the deterioration even in a strong alkaline electrolytic solution is desired for the LDH in alkaline secondary batteries. In this respect, the functional layer of the present embodiment has high alkaline resistance in that the surface microstructure and crystalline structure do not change even in such a severe alkaline resistance test. On the other hand, the functional layer of the present embodiment can also exhibit high ion conductivity suitable for the use as a separator for alkaline secondary batteries to take the advantage of the inherent properties of LDH. The present embodiment can accordingly provide a LDH containing functional layer having not only high ion conductivity but also high alkaline resistance.

According to an exemplary embodiment of the present invention, the basic hydroxide layers of LDH includes Ni, Al, Ti, and OH groups. Zn may be contained in the hydroxide base layers or between the hydroxide basic layers, and may also be present at any site within the LDH. The intermediate layers are composed of anions and $H_2O$ as described above. Although the alternately stacked structure itself of basic hydroxide layers and intermediate layers is basically the same as the generally known alternately stacked structure of LDH, the functional layer of the embodiment, which is composed of the basic hydroxide layers mainly having Ni, Al, Ti and OH groups of LDH, can exhibit high alkaline resistance. Although the reason is not clear, it is believed that Al, which has been considered to be easily dissolved in an alkaline solution, is hard to elute into the alkaline solution due to some interaction with Ni and Ti. Nevertheless, the functional layer of the embodiment can also exhibit high ion conductivity suitable for separators for alkaline secondary batteries. Ni in the LDH can have the form of nickel ions. Although nickel ions in the LDH are typically believed to be $Ni^{2+}$, they may be present in any other valence, for example, $Ni^{3+}$. Al in the LDH can have the form of nickel ions. Although aluminum ions in the LDH are typically believed to be $Al^{3+}$, they may be present in any other valence. Ti in the LDH can have the form of titanium ions. Although titanium ions in the LDH are typically believed to be $Ti^{4+}$, they may be present in any other valence, for example, $Ti^{3+}$. Zn in the LDH can have the form of zinc ions. Although zinc ions in the LDH are typically believed to be $Zn^{2+}$, they may be present in any other valence. The basic hydroxide layers may contain other elements or ions as long as they contain Ni, Al, Ti and OH groups. The basic hydroxide layers may further contain, for example, K (typically, $K^+$). However, the basic hydroxide layers preferably contain Ni, Al, Ti, OH groups and optional Zn as main constituent elements. That is, it is preferred that the basic hydroxide layers are mainly composed of Ni, Al, Ti, OH groups and optional Zn. Accordingly, the basic hydroxide layers are typically composed of Ni, Al, Ti, OH groups and optional Zn, K and/or incidental impurities. Each of the incidental impurities is any element which may be inevitably mixed in a manufacturing process, and it may be mixed into the LDH from, for example, a raw material or a basic material. As described above, it is impractical or impossible to strictly specify the LDH with a general formula since valences of Ni, Al, Ti and Zn are not necessarily confirmed. Assuming that the basic hydroxide layers are mainly composed of $Ni^{2+}$, $Al^{3+}$, $Ti^{4+}$, $Zn^{2+}$ and OH groups, the basic composition of the corresponding LDH can be represented by the general formula: $Ni^{2+}_{1-x-y}$ $Al^{3+}{}_x Ti^{4+}{}_y Zn^{2+}{}_z(OH)_2 A^{n-}{}_{(x+2y)/n} \cdot mH_2O$, wherein $A^{n-}$ is an n-valent anion, n is an integer of 1 or more, preferably 1 or 2, x is above 0 to below 1, preferably 0.01 to 0.5, y is above 0 to below 1, preferably 0.01 to 0.5, x+y is above 0 to below 1, z is 0.04 to below 1, preferably 0.04 to 0.25, and m is a real number of 0 or more, typically a real number of above 0 or 1 or more. However, it should be understood that the general formula indicates merely the "basic composition", and it may be replaced with other elements or ions (including elements with other valences of the same element, or elements or ions that may be unavoidably mixed in the manufacturing process) to such an extent that the elements such as $Ni^{2+}$, $Al^{3+}$, $Ti^{4+}$ and $Zn^{2+}$ do not impair the basic properties of LDH.

Figure 1:
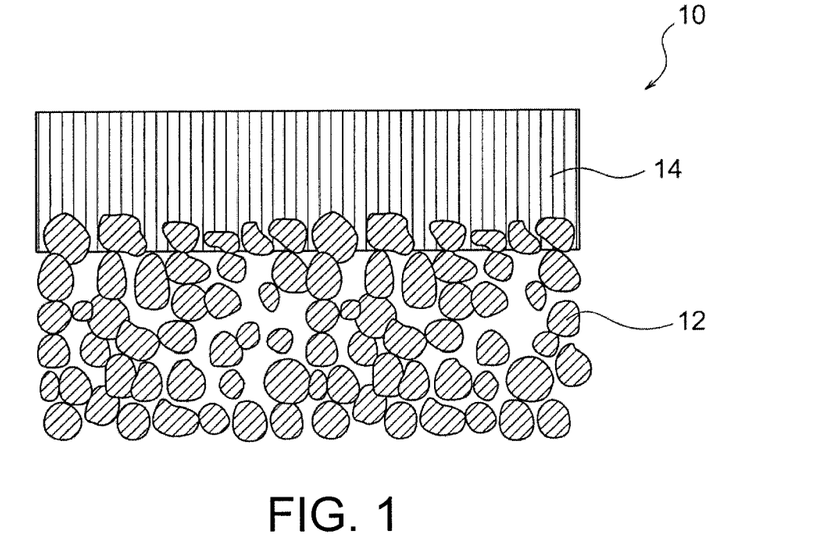
FIG. 1 is a schematic cross-sectional view illustrating a LDH containing composite material of one embodiment of the present invention.
Figure 2:
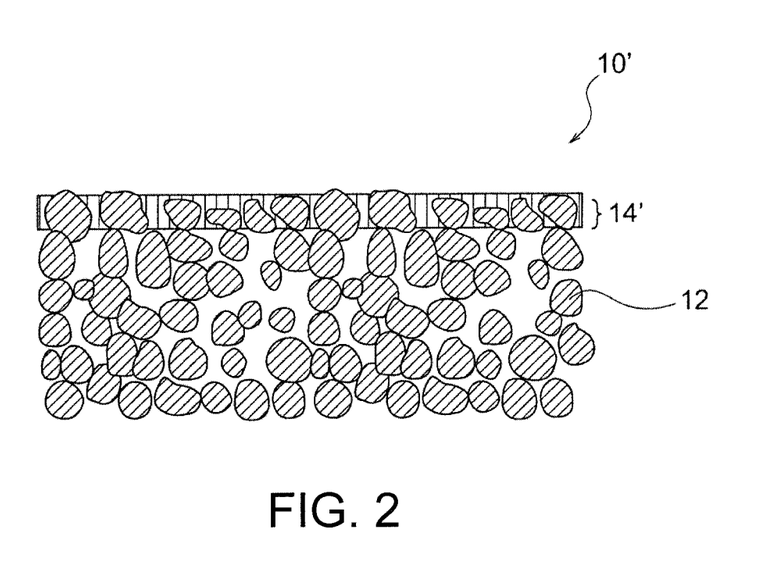
FIG. 2 is a schematic cross-sectional view illustrating a LDH containing composite material of one another embodiment of the present invention.

Preferably, the functional layer is disposed on the porous substrate and/or embedded into the porous substrate. That is, a preferred embodiment of the present invention provides a composite material comprising a porous substrate and a functional layer disposed on the porous substrate and/or embedded into the porous substrate. For example, as in the composite material 10 shown in FIG. 1, a part of the functional layer 14 may be embedded in the porous substrate 12 and the remaining part may be disposed on the porous substrate 12. In this case, the portion of the functional layer 14 on the porous substrate 12 is a membrane portion made of a LDH membrane, and the portion of the functional layer 14 embedded into the porous substrate 12 is a composite portion composed of the porous substrate and the LDH. The composite portion is typically in the form in which the inside of the pores of the porous substrate 12 is filled with the LDH. Also, in the case where the entire functional layer 14' is embedded in the porous substrate 12 as the composite material 10' shown in FIG. 2, the functional layer 14' is mainly composed of the porous substrate 12 and the LDH. The composite material 10' and the functional layer 14' shown in FIG. 2 can be formed by removing the membrane portion (LDH membrane) of the functional layer 14 from the composite material 10 shown in FIG. 1 by a known method such as polishing or cutting. In FIGS. 1 and 2, the functional layers 14, 14' are embedded only in a part of the vicinity of the surface of the porous substrates 12, 12', but the functional layers may be embedded in any part of the porous substrate and over the entire part or the entire thickness of the porous substrate.

The porous substrate in the composite material of the present invention can preferably form the LDH containing functional layer thereon and/or therein. The substrate may be composed of any material and have any porous structure. Although It is typical to form the LDH containing functional layer on and/or in the porous substrate, the LDH containing functional layer may be formed on a non-porous substrate and then the non-porous substrate may be modified into a porous form by any known method. In any case, the porous substrate has advantageously a porous structure having good water permeability and it can deliver electrolytic solution to the functional layer when incorporated into a battery as a separator for the battery.

The porous substrate is composed of, preferably, at least one selected from the group consisting of ceramic materials, metallic materials, and polymeric materials, more preferably, at least one selected from the group consisting of ceramic materials and polymeric materials. More preferably, the porous substrate is composed of ceramic materials. In this case, preferred examples of the ceramic material include alumina, zirconia, titania, magnesia, spinel, calcia, cordierite, zeolite, mullite, ferrite, zinc oxide, silicon carbide, and any combination thereof. More preferred examples include alumina, zirconia, titania, and any combination thereof. Particularly preferred examples include alumina, zirconia (for example, yttria-stabilized zirconia (YSZ)), and combination thereof. Using these porous ceramics, a LDH containing functional layer with high density can be readily formed. Preferred examples of the metallic material include aluminum, zinc, and nickel. Preferred examples of the polymeric material include polystyrene, polyethersulfone, polypropylene, epoxy resin, poly(phenylene sulfide), hydrophilized fluororesin (such as tetrafluoro resin: PTFE), cellulose, nylon, polyethylene and any combination thereof. All these preferred materials have high resistance to the alkaline electrolytic solution of the battery.

The porous substrate has preferably a mean pore diameter of at most 100 μm, more preferably at most 50 μm, for example, typically 0.001 to 1.5 μm, more typically 0.001 to 1.25 μm, further more typically 0.001 to 1.0 μm, particularly typically 0.001 to 0.75 μm, most typically 0.001 to 0.5 μm. Within these ranges, a dense LDH containing functional layer having no water permeability can be formed while keeping desirable water permeability and strength as a support for the porous substrate without the functional layer. In the present invention, the mean pore size can be determined by measuring the largest dimension of each pore based on the electron microscopic image of the surface of the porous substrate. The electron microscopic image is measured at 20,000-fold magnification or more. All the measured pore sizes are listed in order of size to calculate the average, from which the subsequent 15 larger sizes and the subsequent 15 smaller sizes, i.e., 30 diameters in total, are selected in one field of view. The selected sizes of two fields of view are then averaged to yield the average pore size. In the measurement, a dimension measuring function in software of SEM or image analyzing software (for example, Photoshop manufactured by Adobe) can be used.

The porous substrate has a porosity of preferably 10 to 60%, more preferably 15 to 55%, most preferably 20 to 50%. Within these ranges, the resulting dense LDH containing functional layer has no water permeability while the porous substrate keeps desirable water permeability and required strength as a support. The porosity of the porous substrate can be preferably measured by Archimedes' method.

The functional layer preferably has no air permeability. That is, it is preferred that the functional layer be densified with the LDH to such an extent that it has no air permeability. In the present specification, the phrase "having no air permeability" indicates that no bubbling of helium gas is observed at one side of the measured object, i.e., the functional layer or the porous substrate even if helium gas is brought into contact with the other side in water under a differential pressure of 0.5 atm across the thickness, as described in Patent Document 2 (WO2016/076047). By this densification, the functional layer or the composite material as a whole selectively allows only the hydroxide ion due to its hydroxide ion conductivity to pass through, and can function as separators for batteries. In the case of the application of LDH as solid electrolyte separators for batteries, although the bulk LDH dense body has high resistance, the LDH containing functional layer in a preferred embodiment of the present invention can be thinned to reduce the resistance because the porous substrate has high strength. In addition, the porous substrate can have high water permeability and air permeability; hence, the electrolyte can reach the LDH containing functional layer when used as solid electrolyte separators of batteries. In summary, the LDH containing functional layer and the composite material of the present invention are very useful materials for solid electrolyte separators applicable to various batteries, such as metal air batteries (for example, zinc air batteries) and various other zinc secondary batteries (for example, nickel zinc batteries).

In the functional layer or the composite material including the functional layer, a helium permeability per unit area is preferably 10 cm/min·atm or less, more preferably 5.0 cm/min·atm or less, most preferably 1.0 cm/min·atm or less. The functional layer having such a range of helium permeability has extremely high density. When the functional layer having a helium permeability of 10 cm/min·atm or less is applied as a separator in an alkaline secondary battery, passage of substances other than hydroxide ions can be effectively prevented. For example, zinc secondary batteries can significantly effectively suppress penetration of zinc ions or zincate ions in the electrolytic solution. Since penetration of Zn is remarkably suppressed in this way, it can be believed in principle that deposition of dendritic zinc can be effectively suppressed in zinc secondary batteries. The helium permeability is measured through supplying helium gas to one surface of the functional layer to allow helium gas to pass through the functional layer and calculating the helium permeability to evaluate density of the functional layer. The helium permeability is calculated from the expression of $F/(P \times S)$ where F is the volume of permeated helium gas per unit time, P is the differential pressure applied to the functional layer when helium gas permeates through, and S is the area of the membrane through which helium gas permeates. Evaluation of the permeability of helium gas in this manner can extremely precisely determine the density. As a result, a high degree of density that does not permeate as much as possible (or permeate only a trace amount) substances other than hydroxide ions (in particular, zinc that causes deposition of dendritic zinc) can be effectively evaluated. Helium gas is suitable for this evaluation because the helium gas has the smallest constitutional unit among various atoms or molecules which can constitute the gas and its reactivity is extremely low. That is, helium does not form a molecule, and helium gas is present in the atomic form. In this respect, since hydrogen gas is present in the molecular form ($H_2$), atomic helium is smaller than molecular $H_2$ in a gaseous state. Basically, $H_2$ gas is combustible and dangerous. By using the helium gas permeability defined by the above expression as an index, the density can be objectively and readily evaluated regardless of differences in sample size and measurement condition. Thus, whether the functional layer has sufficiently high density suitable for separators of zinc secondary batteries can be evaluated readily, safely and effectively. The helium permeability can be preferably measured in accordance with the procedure shown in Evaluation 3 in Examples described later.

The functional layer has preferably a thickness of 100 μm or less, more preferably 75 μm or less, further preferably 50 μm or less, particularly preferably 25 μm or less, most preferably 5 μm or less. Such thinning can reduce the resistance of the functional layer. In the case where the functional layer is formed as the LDH membrane on the porous substrate, the thickness of the functional layer corresponds to the thickness of the pure membrane portion composed of the LDH membrane. In the case where the functional layer is formed to be embedded into the porous substrate, the thickness of the functional layer corresponds to the thickness of the composite portion composed of the porous substrate and the LDH. In the case where the functional layer is formed on and in the porous substrate, the thickness of the functional layer corresponds to the total thickness of the membrane portion (the LDH membrane) and the composite portion (the porous substrate and the LDH). In any case, the above thickness leads to a low resistance suitable for practical use in, for example, battery application. Although the lower limit of the thickness of the oriented LDH membrane is not limited because it depends on the application, the thickness is preferably 1 μm or more, more preferably 2 μm or more in order to assure a certain degree of rigidity suitable for a functional membrane such as a separator.

The LDH containing functional layer and the composite material can be produced by any method. They can be produced by appropriately modifying conditions of a known method for producing LDH containing functional layers and composite materials (see, for example, Patent Documents 1 and 2). For example, the LDH containing functional layer and the composite material can be produced by (1) providing a porous substrate, (2) applying a titanium oxide sol or a mixed sol of alumina and titania onto the porous substrate and then heating the sol to form a titanium oxide layer or an alumina/titania layer, (3) immersing the porous substrate into an aqueous raw material solution containing nickel ions ($Ni^{2+}$) and urea, (4) hydrothermally treating the porous substrate in the aqueous raw material solution to form the LDH containing functional layer on the porous substrate and/or in a porous substrate, and (5) immersing the LDH containing functional layer in a Zn containing solution (for example, an aqueous solution containing zinc ions and/or zincate ions) to incorporate Zn into the LDH. In particular, in Step (2), forming the titanium oxide layer or the alumina/titania layer on the porous substrate can not only produce a raw material for the LDH, but also serve as a seed of LDH crystalline growth and uniformly form the LDH containing functional layer that is highly densified on the surface of the porous substrate. In addition, in Step (3), the presence of urea raises the pH value through generation of ammonia in the solution through the hydrolysis of urea, and gives the LDH by formation of hydroxide with coexisting metal ions. Also, generation of carbon dioxide in hydrolysis gives the LDH of a carbonate anion type. In Step (5), hydrothermal treatment may be performed after immersing the LDH containing functional layer in the Zn containing solution.

EXAMPLES

The present invention will be described in more detail by the following examples.

Example 1 (Comparative)

Various functional layers and composite materials including Ni/Al/Ti-containing LDH were prepared and evaluated by the following procedures.
(1) Preparation of Porous Substrate One hundred parts by weight of zirconia powder (TZ-8YS manufactured by Tosoh Corporation), 70 parts by weight of a dispersing medium (xylene:butanol=1:1), 11.1 parts by weight of a binder (polyvinyl butyral: BM-2 manufactured by Sekisui Chemical Co., Ltd.), 5.5 parts by weight of a plasticizer (DOP manufactured by Kurogane Kasei Co., Ltd.), and 2.9 parts by weight of a dispersant (Rheodol SP-O30 manufactured by Kao Corporation) were mixed, and the mixture was stirred to be deformed under reduced pressure to yield a slurry. The slurry was shaped into a sheet on a PET membrane with a tape shaping machine to yield a green sheet having the membrane thickness of 220 μm after drying. The green sheet was cut into 2.0 cm×2.0 cm×0.022 cm and fired at 1100° C. for two hours to yield a porous substrate made of zirconia.

The porosity of the porous substrate was measured to be 40% by Archimedes' method.

The observed mean pore size of the porous substrate was 0.2 μm. The mean pore size was determined by measuring the longest dimension of each pore based on the scanning electron microscopic (SEM) image of the surface of the porous substrate. The SEM image was observed at 20,000-fold magnification. All the measured pore sizes are listed in order of size to calculate the average, from which the subsequent 15 larger sizes and the subsequent 15 smaller sizes, i.e., 30 diameters in total, are selected in one field of view. The selected sizes of two fields of view are then averaged to yield the average pore size. This measurement employed a dimension measuring function in software of SEM was used.

(2) Coating of Alumina/Titania Sol on Porous Substrate

An amorphous alumina solution (Al-ML15 manufactured by Taki Chemical Co., Ltd.) and a titanium oxide sol solution (M-6 manufactured by Taki Chemical Co., Ltd.) (weight ratio of 1:1) were mixed to prepare a mixed sol. The zirconia porous substrate prepared in Procedure (1) was coated with 0.2 mL of the mixed sol by spin coating. In the spin coating, the mixed sol was dropwise added to the substrate spinning at a rotation rate of 8,000 rpm, then the spin was stopped after five seconds. The substrate was placed on a hot plate heated to 100° C. and dried for one minute. The substrate was then heated at 150° C. in an electric furnace. The thickness of the layer formed by this procedure was about 1 μm.

(3) Preparation of Aqueous Raw Material Solution

Nickel nitrate hexahydrate (Ni $(NO_3)_2 \cdot 6H_2O$, manufactured by Kanto Chemical CO., Inc.), and urea $((NH_2)_2CO$, manufactured by Sigma-Aldrich Corporation) were provided as raw materials. Nickel nitrate hexahydrate was weighed to be 0.03 mol/L, placed in a beaker, and ion-exchanged water was added thereto into the total amount 75 mL. After stirring the solution, the urea weighed at a urea/$NO_3^-$ molar ratio of 16 was added, and further stirred to give an aqueous raw material solution.

(4) Formation of Membrane by Hydrothermal Treatment

The aqueous raw material solution prepared in Procedure (3) and the substrate prepared in Procedure (2) were placed in a Teflon™ hermetic container (autoclave, the internal volume: 100 mL, and covered with stainless steel jacket). The substrate was horizontally fixed away from the bottom of the Teflon™ hermetic container such that the solution was in contact with the two surfaces of the substrate. A LDH was then formed on the surface and in the interior of the substrate by hydrothermal treatment at a temperature of 120° C. for 20 hours. After a predetermined period, the substrate was removed from the hermetic container, washed with ion-exchanged water, and dried at room temperature for twelve hours to yield a LDH containing functional layer partly embedded in the porous substrate. The thickness of the functional layer was about 5 μm (including the thickness of the portion embedded in the porous substrate).

Examples 2 to 4

Functional layers and composite materials were prepared as in Procedures (1) to (4) of Example 1. Zn was incorporated into the resultant functional layers and the composite materials in the following procedure (5) to prepare Zn containing functional layers and composite materials.

(5) Incorporation of Zn by Immersion in a Zn Containing Solution

Zinc oxide was dissolved in a 7 mol/L aqueous potassium hydroxide solution to yield an aqueous potassium hydroxide solution containing zinc oxide in a concentration of 0.6 mol/L. The aqueous potassium hydroxide solution (15 mL) was placed in a hermetic container made of Teflon™. The composite material containing the functional layer produced in Procedure (4) was placed on the bottom of the hermetic container such that the functional layer faced upward, and the cover was closed. The composite materials were stored for one day or about 24 hours (Example 2), three days or about 72 hours (Example 3) or seven days or about 168 hours (Example 4) at 30° C., and then removed from the hermetic container. After removing the composite materials, the composite materials were immersed in a container containing ion-exchanged water for 10 seconds, and then removed. Immersion of the composite materials in ion-exchanged water was repeated further two times. The removed composite materials were dried overnight at room temperature.

<Evaluations>

The following various evaluations were performed on the resultant functional layers or composite materials.

Evaluation 1: Elemental Analysis (EDS) I

Compositional analysis was performed on the surface of the functional layer with an EDS analyzer (a brand name of the analyzer: X-act, manufactured by Oxford Instruments plc) to calculate an atomic ratio Zn/(Ni+Ti+Al+Zn). This analysis comprises 1) taking an image at an acceleration voltage of 20 kV with 5,000-fold magnification, 2) analysis in a point analytic mode at three points spaced with about 5 μm each other, 3) repeating Steps 1) and 2) further two times, and 4) calculation of the average value of nine points in total. The results are shown in Table 1.

Evaluation 2: Measurement of Ion Conductivity

Figure 3:
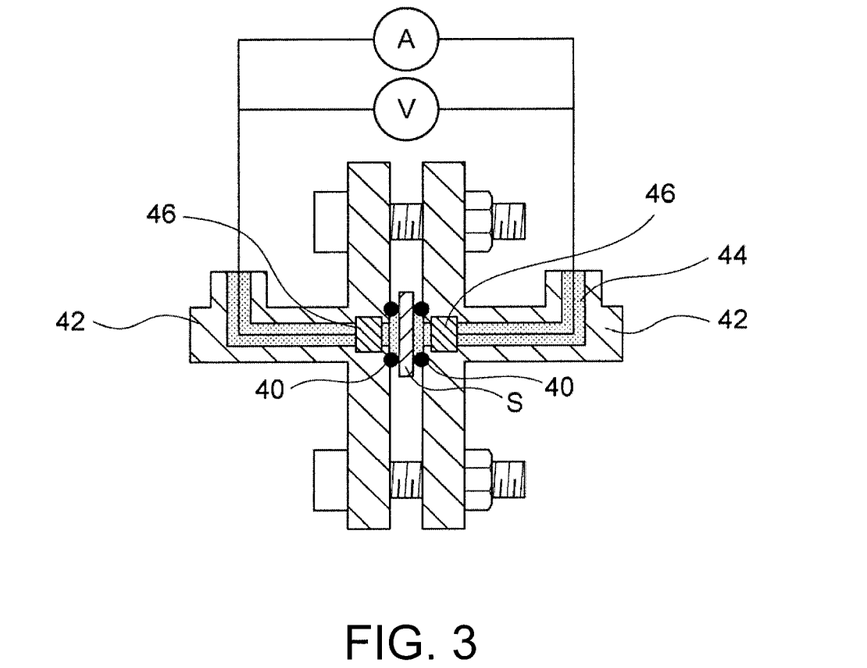
FIG. 3 is a schematic cross-sectional view illustrating an electrochemical measurement system used in Examples 1 to 4.

The conductivity of the functional layer in the electrolytic solution was measured with an electrochemical measurement system shown in FIG. 3 as follows. A composite material sample S (a porous substrate with an LDH membrane) was sandwiched between two silicone gaskets 40 having a thickness of 1 mm and assembled into a PTFE flange-type cell 42 having an inner diameter of 6 mm. Electrodes 46 made of #100 nickel wire mesh were assembled into a cylinder having a diameter of 6 mm in the cell 42, and the distance between the electrodes was 2.2 mm. The cell 42 was filled with an aqueous electrolytic solution 44 containing 6M potassium hydroxide. Using electrochemical measurement system (potentio-galvanostat frequency responsive analyzers 1287A and 1255B manufactured by Solartron), the sample was observed under the conditions of a frequency range of 1 MHz to 0.1 Hz and an applied voltage of 10 mV, and the resistance of the composite material sample S (the porous substrate with LDH membrane) was determined from the intercept across a real number axis. The resistance of the porous substrate without the LDH membrane was also measured in the same manner. The resistance of the LDH membrane was determined from the difference in resistance between the composite material sample S (the porous substrate with the LDH membrane) and the substrate. The conductivity was determined with the resistance, the thickness, and the area of the LDH membrane. The results are shown in Table 1.

Evaluation 3: Identification of Functional Layer

The crystalline phase of the functional layer was measured with an X-ray diffractometer (RINT TTR III manufactured by Rigaku Corporation) at a voltage of 50 kV, a current of 300 mA, and a measuring range of 10° to 70° to give an XRD profile. The XRD profile was identified with the diffraction peaks of LDH (hydrotalcite compound) described in JCPDS card NO. 35-0964. The functional layers in Examples 1 to 4 were identified as the LDH (hydrotalcite compound).

Evaluation 4: Elemental Analysis (EDS) II

The functional layer was polished across the thickness with a cross-sectional polisher (CP). One field of cross-sectional image of the functional layer was observed at a 10,000-fold magnification with FE-SEM (ULTRA 55, manufactured by Carl Zeiss). The LDH membrane on the substrate surface and the LDH portion (by point analysis) inside the substrate in this cross-sectional image was subjected to elemental analysis at an accelerating voltage of 15 kV with an EDS analyzer (NORAN System SIX, manufactured by Thermo Fisher Scientific Inc.). C, Al, Ti and Ni, which are constituent elements of the LDH, were detected from the LDH contained in the functional layers in Example 1, and C, Al, Ti, Ni and Zn, which are constituent elements of the LDH, were detected from the LDH contained in the functional layers in Examples 2 to 4. Al, Ti and Ni are constituent elements of the basic hydroxide layer while C corresponds to $CO_3^{2-}$ that is an anion constituting the intermediate layer of LDH. It is believed that Zn may be a constituent element of basic hydroxide layers or present between the basic hydroxide layers.

Evaluation 5: Evaluation of Alkaline Resistance

Zinc oxide was dissolved in a 6 mol/L aqueous potassium hydroxide solution to yield 6 mol/L of aqueous potassium hydroxide solution containing zinc oxide in a concentration of 0.4 mol/L. 15 mL of the resultant aqueous potassium hydroxide solution was placed in a hermetic container made of Teflon™. A composite material having dimensions of 1 cm×0.6 cm was placed on the bottom of the hermetic container such that the functional layer faced upward, and the cover was closed. The composite material was held at 70° C. for three weeks or 504 hours, and then removed from the hermetic container. The composite material was dried overnight at room temperature. The microstructure of the resultant sample was observed with SEM and the crystalline structure was analyzed with XRD. A variation in crystalline structure was determined by existence or non-existence of a shift in the (003) peak derived from the LDH based on the XRD profile. No change in the surface microstructure and the crystalline structure was observed in all Examples 1 to 4.

Evaluation 6: Measurement of Helium Permeability

A helium permeation test was conducted to evaluate the density of the functional layer from the viewpoint of helium permeability. The helium permeability measurement system 310 shown in FIGS. 4A and 4B was constructed. The helium permeability measurement system 310 was configured to supply helium gas from a gas cylinder filled with helium gas to a sample holder 316 through a pressure gauge 312 and a flow meter 314 (digital flow meter), and to discharge the gas by permeating from one side to the other side of the functional layer 318 held by the sample holder 316.

Figure 4A:
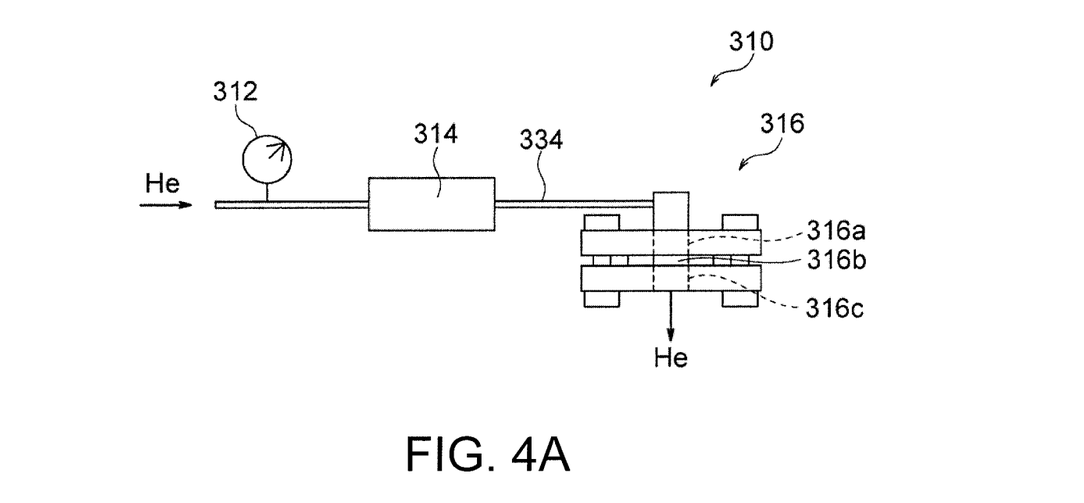
FIG. 4A is a schematic view illustrating an example system of measuring helium permeability used in Examples 1 to 4.
Figure 4B:
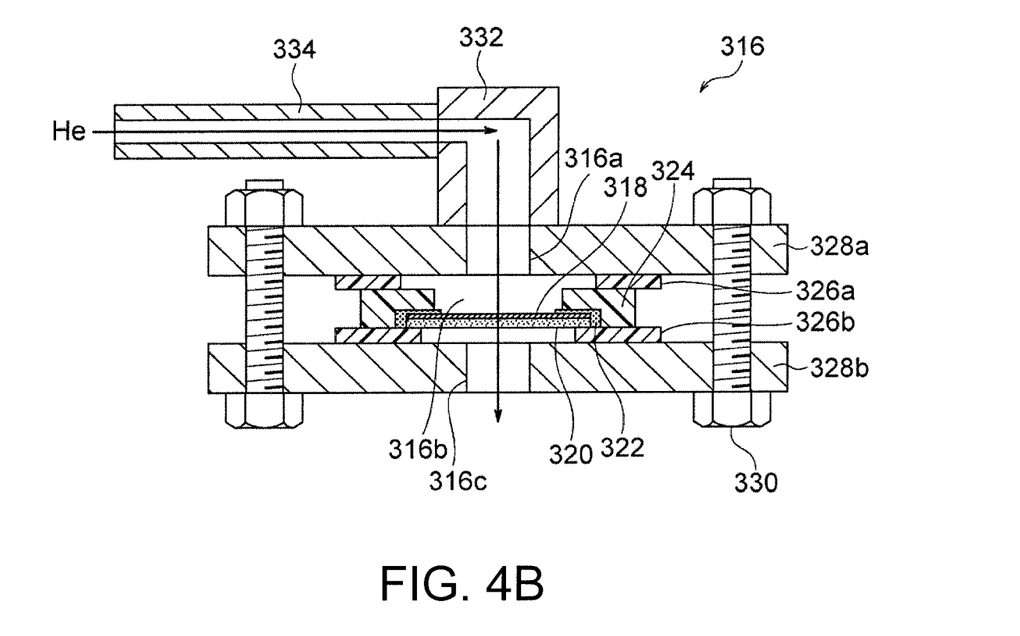
FIG. 4B is a schematic cross-sectional view of a sample holder and its peripheral configuration used in the measuring system shown in FIG. 4A.

The sample holder 316 had a structure including a gas supply port 316a, a sealed space 316b and a gas discharge port 316c, and was assembled as follows: An adhesive 322 was applied along the outer periphery of the functional layer 318 and bonded to a jig 324 (made of ABS resin) having a central opening. Gaskets or sealing members 326a, 326b made of butyl rubber were disposed at the upper end and the lower end, respectively, of the jig 324, and then the outer sides of the members 326a, 326b were held with supporting members 328a, 328b (made of PTFE) each including a flange having an opening. Thus, the sealed space 316b was partitioned by the functional layer 318, the jig 324, the sealing member 326a, and the supporting member 328a. The functional layer 318 was in the form of a composite material formed on the porous substrate 320, and was disposed such that the functional layer 318 faced the gas supply port 316a. The supporting members 328a and 328b were tightly fastened to each other with fastening means 330 with screws not to cause leakage of helium gas from portions other than the gas discharge port 316c. A gas supply pipe 334 was connected to the gas supply port 316a of the sample holder 316 assembled as above through a joint 332.

Helium gas was then supplied to the helium permeability measurement system 310 via the gas supply pipe 334, and the gas was permeated through the functional layer 318 held in the sample holder 316. Then, a gas supply pressure and a flow rate were monitored with a pressure gauge 312 and a flow meter 314. After permeation of helium gas for one to thirty minutes, the helium permeability was calculated. The helium permeability was calculated from the expression of F/(P×S) where F ($cm^3$/min) was the volume of permeated helium gas per unit time, P (atm) was the differential pressure applied to the functional layer when helium gas permeated through, and S ($cm^2$) was the area of the membrane through which helium gas permeates. The permeation rate F ($cm^3$/min) of helium gas was read directly from the flow meter 314. The gauge pressure read from the pressure gauge 312 was used for the differential pressure P. Helium gas was supplied such that the differential pressure P was within the range of 0.05 to 0.90 atm. Helium permeability through the functional layer and the composite material was 1.0 $cm^3$/min·atm or less in all Examples 1 to 4.

TABLE 1

| | Immersion in alkaline solution Time of immersion (days) | Result of EDS analysis Atomic ratio Zn/(Ni + Ti + Al + Zn) | Evaluation of ion conductivity Ion conductivity (mS/cm) |
| --- | --- | --- | --- |
| Example 1* | not immersed | 0 | 2.0 |
| Example 2 | 1 | 0.06 | 2.8 |
| Example 3 | 3 | 0.08 | 3.3 |
| Example 4 | 7 | 0.15 | 3.4 |

*comparative example

What is claimed is:
1. A functional layer comprising a layered double hydroxide that comprises Ni, Al, Ti and Zn, and has an atomic ratio Zn/(Ni+Ti+Al+Zn) of 0.04 or more determined by an energy dispersive X-ray analysis (EDS).

2. The functional layer according to claim 1, wherein the atomic ratio Zn/(Ni+Ti+Al+Zn) is 0.04 to 0.25.

3. The functional layer according to claim 1, wherein the functional layer has a hydroxide ion conductivity.

4. The functional layer according to claim 1, wherein the functional layer has an ion conductivity of 2.6 mS/cm or more.

5. The functional layer according to claim 1, wherein the layered double hydroxide undergoes no change in surface microstructure and crystalline structure when immersed in a 6 mol/L aqueous potassium hydroxide solution containing zinc oxide in a concentration of 0.4 mol/L at 70° C. for three weeks.

6. The functional layer according to claim 1, wherein the functional layer has a helium permeability per unit area of 10 cm/min·atm or less.

7. The functional layer according to claim 1, wherein the functional layer has a thickness of 100 μm or less.

8. The functional layer according to claim 1, wherein the functional layer has a thickness of 50 μm or less.

9. The functional layer according to claim 1, wherein the functional layer has a thickness of 5 μm or less.

10. A composite material comprising:
a porous substrate; and
a functional layer according to claim 1 provided on the porous substrate and/or embedded in the porous substrate.

11. The composite material according to claim 10, wherein the porous substrate is composed of at least one selected from the group consisting of ceramic materials, metallic materials, and polymeric materials.

12. A battery comprising, as a separator, the functional layer according to claim 1.

13. A battery comprising, as a separator, the composite material according to claim 10.

* * * * *